US010482846B2

(12) United States Patent
Fujimori (10) Patent No.: US 10,482,846 B2
(45) Date of Patent: Nov. 19, 2019

(54) DISPLAY DEVICE HAVING PROCESSOR THAT CONTROLS COMMUNICATION WITH EXTERNAL DEVICE, CONTROL METHOD FOR DISPLAY DEVICE, AND DISPLAY SYSTEM

(71) Applicant: SEIKO EPSON CORPORATION, Tokyo (JP)

(72) Inventor: Toshiki Fujimori, Chino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 15/887,241

(22) Filed: Feb. 2, 2018

(65) Prior Publication Data

US 2018/0226058 A1    Aug. 9, 2018

(30) Foreign Application Priority Data

Feb. 6, 2017   (JP) ................. 2017-019238

(51) Int. Cl.
  *G09G 5/12*    (2006.01)
  *G06F 3/14*    (2006.01)
  *G09G 3/00*    (2006.01)

(52) U.S. Cl.
  CPC ............ *G09G 5/12* (2013.01); *G06F 3/1423* (2013.01); *G06F 3/1446* (2013.01); *G09G 3/002* (2013.01); *G09G 2330/00* (2013.01); *G09G 2370/042* (2013.01); *G09G 2370/16* (2013.01)

(58) Field of Classification Search
  CPC ..................... G09G 2300/02; G06F 3/1446
  See application file for complete search history.

(56) References Cited

U.S. PATENT DOCUMENTS

| 8,264,421 | B2 | 9/2012 | Yamada et al. |
| 2005/0168630 | A1 | 8/2005 | Yamada et al. |
| 2011/0234474 | A1* | 9/2011 | Natori ............. H04N 5/04 345/1.3 |
| 2016/0267878 | A1* | 9/2016 | Maeda ............ H04N 9/3147 |

FOREIGN PATENT DOCUMENTS

| JP | 2005-250445 A | 9/2005 |
| JP | 2009-284055 A | 12/2009 |
| JP | 2014-154897 A | 8/2014 |

* cited by examiner

*Primary Examiner* — Chad M Dicke
(74) *Attorney, Agent, or Firm* — Oliff PLC (57) ABSTRACT

A display device includes a communication section configured to perform communication with an external display device, a display section configured to display an image corresponding to image information, and a control section configured to cause the communication section to transmit first information to the external display device and, when receiving second information from the external display device via the communication section after causing the communication section to transmit the first information to the external display device, prohibit the display section from displaying the image for a first period and thereafter cause the display section to display the image.

6 Claims, 6 Drawing Sheets

DISPLAY DEVICE HAVING PROCESSOR THAT CONTROLS COMMUNICATION WITH EXTERNAL DEVICE, CONTROL METHOD FOR DISPLAY DEVICE, AND DISPLAY SYSTEM

CROSS-REFERENCE

The entire disclosure of Japanese Patent Application No. 2017-019238, filed Feb. 6, 2017 is expressly incorporated by reference herein.

BACKGROUND

1. Technical Field

The present invention relates to a display device, a control method for the display device, and a display system.

2. Related Art

There has been known a display system that performs display using a plurality of display devices (e.g., a plurality of projectors). In such a display system, image display is synchronized among the plurality of display devices. JP-A-2005-250445 (Patent Literature 1) describes a display system in which a server and a host PC (personal computer) transmit data concerning time to a plurality of display devices together with image data and the plurality of display devices synchronize image display using the data concerning the time.

In the display system described in Patent Literature 1, besides the plurality of display devices, devices such as the server and the host PC are necessary in order to synchronize the image display. Therefore, components of the system increase.

SUMMARY

An advantage of some aspects of the invention is to provide a technique that can reduce components in a display system that synchronizes image display among a plurality of display devices.

An aspect of the invention is directed to a display device including: a communication section configured to perform communication with an external display device; a display section configured to display an image corresponding to image information; and a control section configured to cause the communication section to transmit first information to the external display device and, when receiving second information from the external display device via the communication section after causing the communication section to transmit the first information to the external display device, prohibit the display section from displaying the image for a first period and thereafter cause the display section to display the image.

According to this aspect, timing of image display of the display device can be controlled by the external display device. Therefore, it is possible to synchronize the image display between the display device and the external display device. Accordingly, it is possible to reduce components compared with a configuration in which image display is synchronized among a plurality of display devices using a server and a host PC other than the display device.

In the display device according to the aspect, it is desirable that the control section starts preparation for the display of the image according to power-on of the display device and, after the preparation is completed, causes the communication section to transmit the first information to the external display device.

It is likely that display preparation periods for the image from power-on times are different in the display device and the external display device. In this case, even if the display device and the external display device are turned on at the same timing, completion timings of the display preparation periods are different in the display device and the external display device.

According to the aspect with this configuration, even if the completion timing of the display preparation period in the external device is later than the completion timing of the display preparation period in the display device, it is possible to synchronize the image display between the display device and the external display device according to the later completion timing of the display preparation period.

In the display device according to the aspect, it is desirable that the control section prohibits the display section from displaying the image according to the transmission of the first information, in case that the communication section does not receive the second information for a second period after the control unit prohibits the display section from displaying the image according to the transmission of the first information, causes the display section to display the image, and, in case that the communication section receives the second information before the second period elapses, prohibits the display section from displaying the image for the first period and thereafter causes the display section to display the image.

According to the aspect with this configuration, in a period from the power-on time until the timing for displaying the image, it is possible to synchronize display start timings for the image between the display device and the external display device while prohibiting the display of the image. Therefore, it is possible to cause a user to feel as if the image display is simultaneously started in the display device and the external display device.

In the display device according to the aspect, it is desirable that, when the second information reaches the communication section after the second period elapses, the control section causes the display section to maintain the display of the image.

If the display of the image is once prohibited after being started, it is likely that the user misunderstands that a failure occurs in the display device.

According to the aspect with this configuration, even if the second information is received after the display of the image is started, the display of the image is maintained. Therefore, it is possible to reduce the likelihood that the user misunderstands that a failure occurs in the display device compared with when the display of the image is once prohibited according to the reception of the second information after the start of the display of the image.

In the display device according to the aspect, it is desirable that, when the communication section receives the second information after the second period elapses, the control section causes the display section to delay next display timing of the image by a third period corresponding to a time shift amount between transmission timing of the first information and reception timing of the second information.

According to the aspect with this configuration, it is possible to synchronize the next display timing of the image between the display device and the external display device.

In the display device according to the aspect, it is desirable that the second information includes identification information, and, when the display device includes same identification information as the identification information added to the second information received by the communication section, the control section prohibits the display section from displaying the image for the first period and thereafter causes the display section to display the image.

According to the aspect with this configuration, it is possible to prevent the display device from displaying the image in synchronization with an unintended external display device.

Another aspect of the invention is directed to a display system including a first display device and a second display device. The first display device and the second display device are the display device according to the aspect explained above.

According to this aspect, it is possible to synchronize image display between the first display device and the second display device without using a server and a host PC other than the display devices. Accordingly, it is possible to reduce components compared with a configuration in which image display is synchronized between the first display device and the second display device using a server and a host PC other than the display devices.

Still another aspect of the invention is directed to a control method for a display device including a communication section configured to perform communication with an external display device and a display section configured to display an image corresponding to image information. The control method including causing the communication section to transmit first information to the external display device and, when receiving second information from the external display device via the communication section after causing the communication section to transmit the first information to the external display device, prohibiting the display section from displaying the image for a first period and thereafter causing the display section to display the image.

According to this aspect, it is possible to reduce components compared with a configuration in which image display is synchronized among a plurality of display devices using a server and a host PC other than the display device.

BRIEF DESCRIPTION OF THE DRAWINGS

The invention will be described with reference to the accompanying drawings, wherein like numbers reference like elements.

DESCRIPTION OF EXEMPLARY EMBODIMENTS

Embodiments of the invention are explained below with reference to the drawings. Note that, in the drawings, dimensions and scales of sections are different from actual dimensions and scales as appropriate. The embodiments described below are preferred specific examples of the invention. Therefore, technically preferred various limitations are added to the embodiments. However, the scope of the invention is not limited to these forms unless, in the following explanation, there are descriptions to the effect that the invention is limited.

First Embodiment

Figure 1:
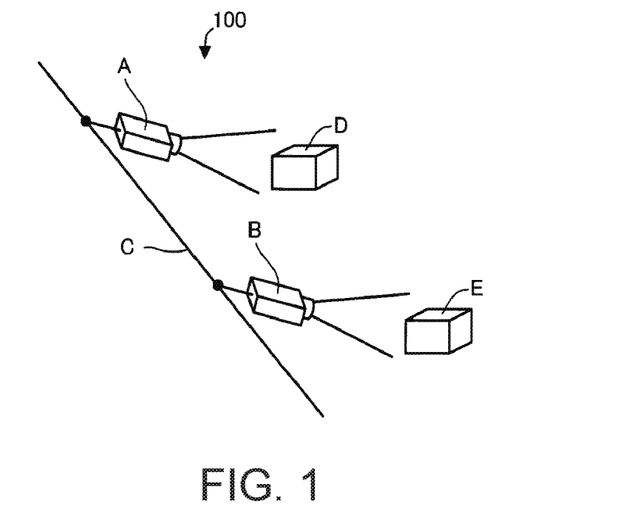
FIG. 1 is a diagram showing an example of a display system according to a first embodiment.

FIG. 1 is a diagram showing an example of a display system 100 according to a first embodiment.

The display system 100 includes projectors A and B. The projector A and the projector B are capable of communicating with each other via a communication line C. IP (Internet Protocol) addresses of the same segment are allocated to the projector A and the projector B. However, the projector A and the projector B do not recognize the presence of the projectors each other. The projector A is an example of the display device and the first display device. The projector B is an example of the external display device and the second display device.

The projector A projects an image visually presenting a commodity D onto the commodity D. The projector B projects an image visually presenting a commodity E onto the commodity E. The commodity D and the commodity E may be commodities of the same type or may be commodities of different types. The image projected by the projector A and the image projected by the projector B may be a common image (moving image or still image) or may be images (moving images or still images) different from each other. When the image projected by the projector A and the image projected by the projector B are different images (in particular, moving images), the images may be images having continuity (e.g., an image in which, at timing when an object displayed on the image projected by the projector A disappears, the same object is displayed anew on the image projected by the projector B). In the following explanation, an example is explained in which the commodity D and the commodity E are commodities of the same type and the image projected by the projector A and the image projected by the projector B are a common moving image.

In the projector A and the projector B, image projection (image display) is synchronized. Therefore, presentation for the commodity D and presentation for the commodity E are synchronized to enable collected presentation of the commodity D and the commodity E.

The projector A and the projector B include components common to each other. Therefore, in order to simplify the explanation, of the projector A and the projector B, components of the projector A and, more specifically, components of the projector A common to the projector B are explained.

Figure 2:
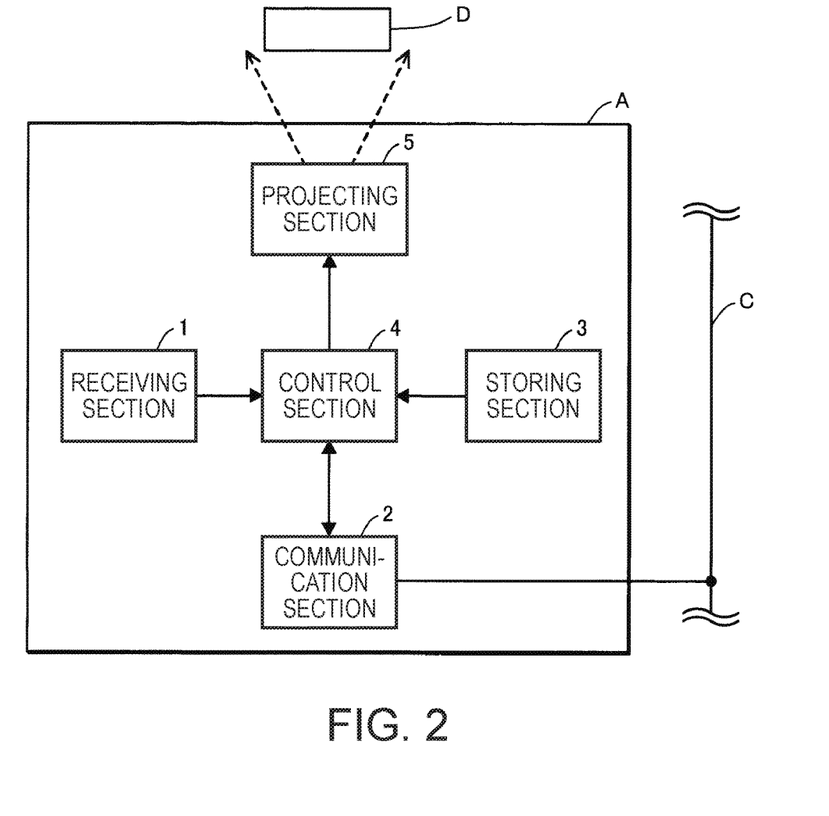
FIG. 2 is a diagram showing an example of a projector.

FIG. 2 is a diagram showing an example of the projector A. The projector A includes a receiving section 1, a communication section 2, a storing section 3, a control section 4, and a projecting section 5.

The receiving section 1 is various operation buttons and operation keys, a touch panel, and the like that receive input operation (e.g., luminance adjustment operation for an image) and the like of a user. The receiving section 1 may be a remote controller or the like that transmits, by radio or wire, information corresponding to input operation received from the user. In that case, the projector A includes a receiving section that receives the information transmitted by the remote controller. Note that the remote controller includes various operation buttons and operation keys, a touch panel, and the like that receive input operation of the user.

The communication section 2 communicates with the projector B via the communication line C. Note that the communication section 2 may communicate with the projector B through wireless communication (or infrared communication or Bluetooth (registered trademark)).

The storing section 3 is a computer-readable recording medium. The storing section 3 may be any one of semiconductor memories and the like such as a HDD (Hard Disk Drive), a USB (Universal Serial Bus) memory, an SD card, a RAM (Random Access Memory), and a ROM (Read Only Memory) or a combination of the semiconductor memories and the like.

The storing section 3 stores moving image information processed by the projector A, schedule information indicating an operation schedule (a moving image reproduction schedule) of the projector A, computer programs, and the like. The moving image information is an example of the image information.

The schedule information indicates a power-on schedule for automatically executing power-on of the projector A at power-on scheduled time and an automatic reproduction start schedule for automatically performing reproduction using moving image information after the power-on.

In the storing section 3, for example, the computer programs are stored in the semiconductor memory and the various kinds of moving image information and the schedule information are stored in the USB memory and the SD card.

The control section 4 is a computer such as a CPU (Central Processing Unit). The control section 4 controls the projector A by reading and executing the computer programs stored in the storing section 3. For example, the control section 4 communicates with the projector B via the communication section 2 and synchronizes moving images (displayed images) between the projector A and the projector B. For example, the control section 4 reads moving image information from the storing section 3 at timing synchronized with the projector B and outputs the moving image information to the projecting section 5. Note that a power supply voltage is supplied to the control section 4 even in a state in which a power supply of the projector A is off. Therefore, the control section 4 can execute the power-on schedule (power-on of the projector A at the power-on scheduled time) on the basis of the schedule information.

Figure 3:
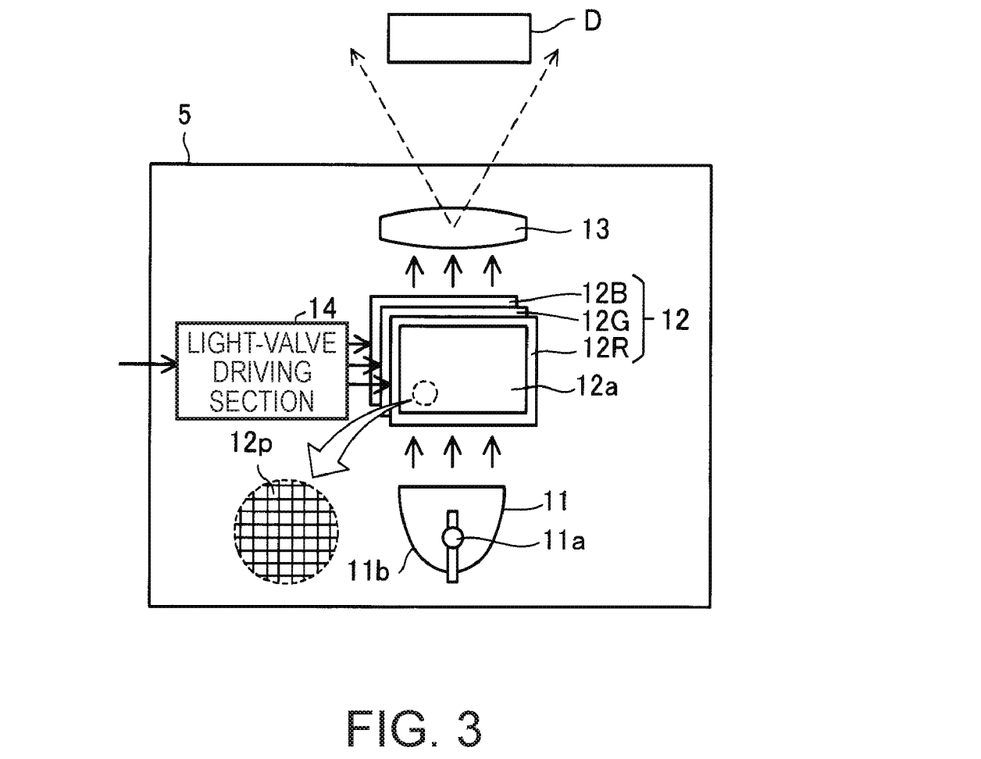
FIG. 3 is a diagram showing an example of a projecting section.

The projecting section 5 is an example of the display section. Note that the display section does not include a projection target (e.g., the commodity D) of a moving image. The projecting section 5 executes display for projecting an image (a moving image) corresponding to the moving image information output by the control section 4 onto the commodity D and presenting the commodity D. FIG. 3 is a diagram showing an example of the projecting section 5. The projecting section 5 includes a light source 11, three liquid crystal light valves (12R, 12G, and 12B), which are examples of the light modulating device, a projection lens 13, which is an example of the projection optical system, and a light-valve driving section 14. The projecting section 5 modulates light emitted from the light source 11 with the liquid crystal light valve 12 to form a projection image (image light), enlarges the projection image, and projects the projection image from the projection lens 13.

The light source 11 includes a light source section 11a including a Xenon lamp, an ultra-high pressure mercury lamp, an LED (Light Emitting Diode), or a laser light source and a reflector 11b that reduces fluctuation in a direction of light emitted by the light source section 11a. Fluctuation in a luminance distribution of the light emitted from the light source 11 is reduced by a not-shown integrator optical system. Thereafter, the light is separated into color light components of red (R), green (G), and blue (B), which are the three primary colors of the light, by a not-shown color-separation optical system. The color light components of R, G, and B are respectively made incident on the liquid crystal light valves 12R, 12G, and 12B.

The liquid crystal light valve 12 is configured by, for example, a liquid crystal panel in which liquid crystal is encapsulated between a pair of transparent substrates. In the liquid crystal light valve 12, a rectangular pixel region 12a including a plurality of pixels 12p arrayed in a matrix shape is formed. It is possible to apply a driving voltage to the liquid crystal for each of the pixels 12p. When the light-valve driving section 14 applies, to the pixels 12p, a driving voltage corresponding to image information (e.g., moving image information) input from the control section 4, the pixels 12p are set to light transmittance corresponding to the image information. Therefore, the light emitted from the light source 11 is transmitted through the pixel region 12a to be modulated. An image corresponding to the image information is formed for each of color lights.

Images of the respective colors are combined for each of pixels 12p by a not-shown color-combination optical system. A projection image, which is a color image (color image light), is generated. The projection image is enlarged and projected onto the commodity D by the projection lens 13.

Figure 4:
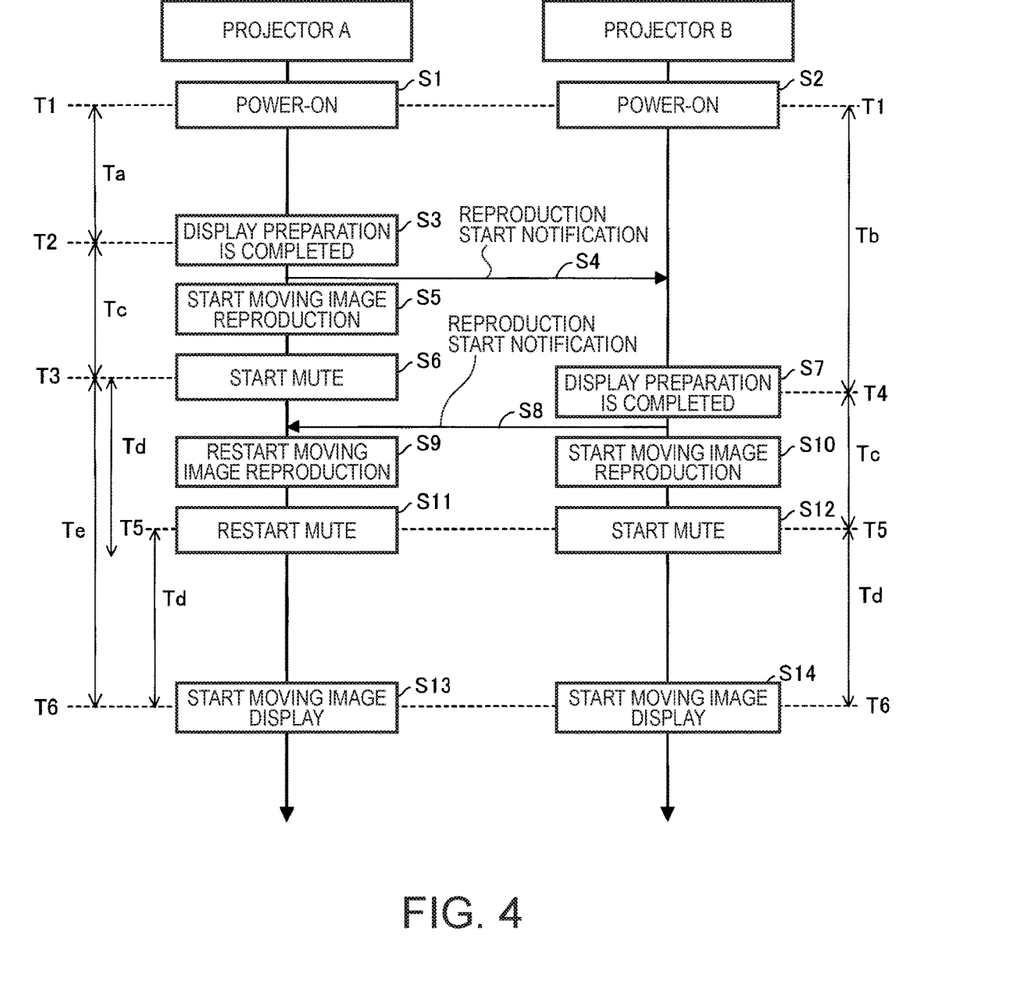
FIG. 4 is a sequence chart for explaining operation in the first embodiment.

Operations are explained. FIG. 4 is a sequence chart for explaining the operations of the projector A and the projector B. Note that it is assumed that common schedule information is stored in the projector A and the projector B.

In the projector A and the projector B, the control sections 4 operate according to the schedule information. The control sections 4 execute power-on when power-on scheduled time T1 comes (steps S1 and S2). The projector A and the projector B start startup according to the power-on.

In the projector A and the projector B, it is highly likely that a time period from the startup start to startup completion (a display preparation period from a display preparation start to display preparation completion) is highly likely to be different according to an individual difference, an environment difference (a temperature difference), or an immediately preceding operation state. In an example shown in FIG. 4, a display preparation period Ta (a period from time T1 to time T2) of the projector A is shorter than a display preparation period Tb (a period from time T1 to time T4) of the projector B. Therefore, in this embodiment, the influence of this time period (display preparation period) difference on a difference between display start timings is reduced. This point is mainly explained below.

When the display preparation (the startup) is completed in the projector A (step S3), in the projector A, the control section 4 controls the communication section 2 and causes the communication section 2 to execute first processing for transmitting a reproduction start notification to the projector B (step S4). At this time, the communication section 2 of the projector A may transmit the reproduction start notification to the communication line C by broadcast without specifying the projector B as a transmission destination of the reproduction start notification. The reproduction start notification transmitted by the projector A is an example of the first information.

The reproduction start notification transmitted in step S4 reaches the projector B. However, since the projector B is starting up, the projector B cannot receive the reproduction start notification. Accordingly, the projector B does not execute operation according to the reproduction start notification.

On the other hand, in the projector A, the control section 4 causes the communication section 2 to execute the first processing and thereafter starts moving image reproduction (step S5). Specifically, the control section 4 of the projector A starts reading of moving image information from the storing section 3. Subsequently, in the projector A, the control section 4 outputs black-out image information indicating a single-color image of black to the projecting section 5, prohibits the projecting section 5 from displaying a moving image, and starts mute (display stop) in a period Td from time T3 (step S6). Therefore, even if the moving image information is read from the storing section 3, an image (a moving image) corresponding to the moving image information is not projected (displayed). The period Td started in step S6 is an example of the second period.

After the mute is started in the projector A, when the display preparation (the startup) is completed at time T4 in the projector B (step S7), in the projector B, the control section 4 controls the communication section 2 and causes the communication section 2 to execute second processing for transmitting a reproduction start notification to the projector A (step S8). At this time, the communication section 2 of the projector B may transmit the reproduction start notification by broadcast without specifying the projector A set as a transmission destination of the reproduction start notification. The reproduction start notification transmitted by the projector B is an example of the second information.

In the projector A, when the communication section 2 receives the reproduction start signal while the mute is executed, the control section 4 restarts the moving image reproduction from the beginning of the moving image (step S9). On the other hand, in the projector B, the control section 4 causes the communication section 2 to execute the second processing and thereafter starts moving image reproduction (reading of moving image information from the storing section 3) (step S10).

Therefore, moving image reproduction in the projector A and moving image reproduction in the projector B are substantially started according to the transmission of the reproduction start notification from the projector B. The moving image reproduction in the projector A and the moving image reproduction in the projector B are synchronized.

Subsequently, in the projectors A and B, the control sections 4 output black-out image information to the projecting sections 5, prohibit the projecting sections 5 from displaying an image, and start mute in the period Td (steps S11 and S12). Mute start timings (time T5) in the projector A and the projector B are substantially timings corresponding to the transmission of the reproduction start notification from the projector B. The mute start timings are synchronized. The period Td started in step S11 is an example of the first period. The period Td started in step S12 is an example of the second period.

Thereafter, in the projectors A and B, at time T6 when the mute in the period Td ends, the control sections 4 output moving image information to the projecting sections 5 and cause the projecting sections 5 to start moving image display (steps S13 and S14). Therefore, it is possible to synchronize display start timing in the projector A and display start timing in the projector B.

Note that both of a time period from the time T2 to the time T3 and a time period from the time T4 to the time T5 are a time period Tc. In the example shown in FIG. 4, a difference between the display preparation period Ta of the projector A and the display preparation period Tb of the projector B is offset by a difference between a mute period Te of the projector A and a mute period Td of the projector B. Consequently, the display start timing of the projector A and the display start timing of the projector B are synchronized.

Figure 5:
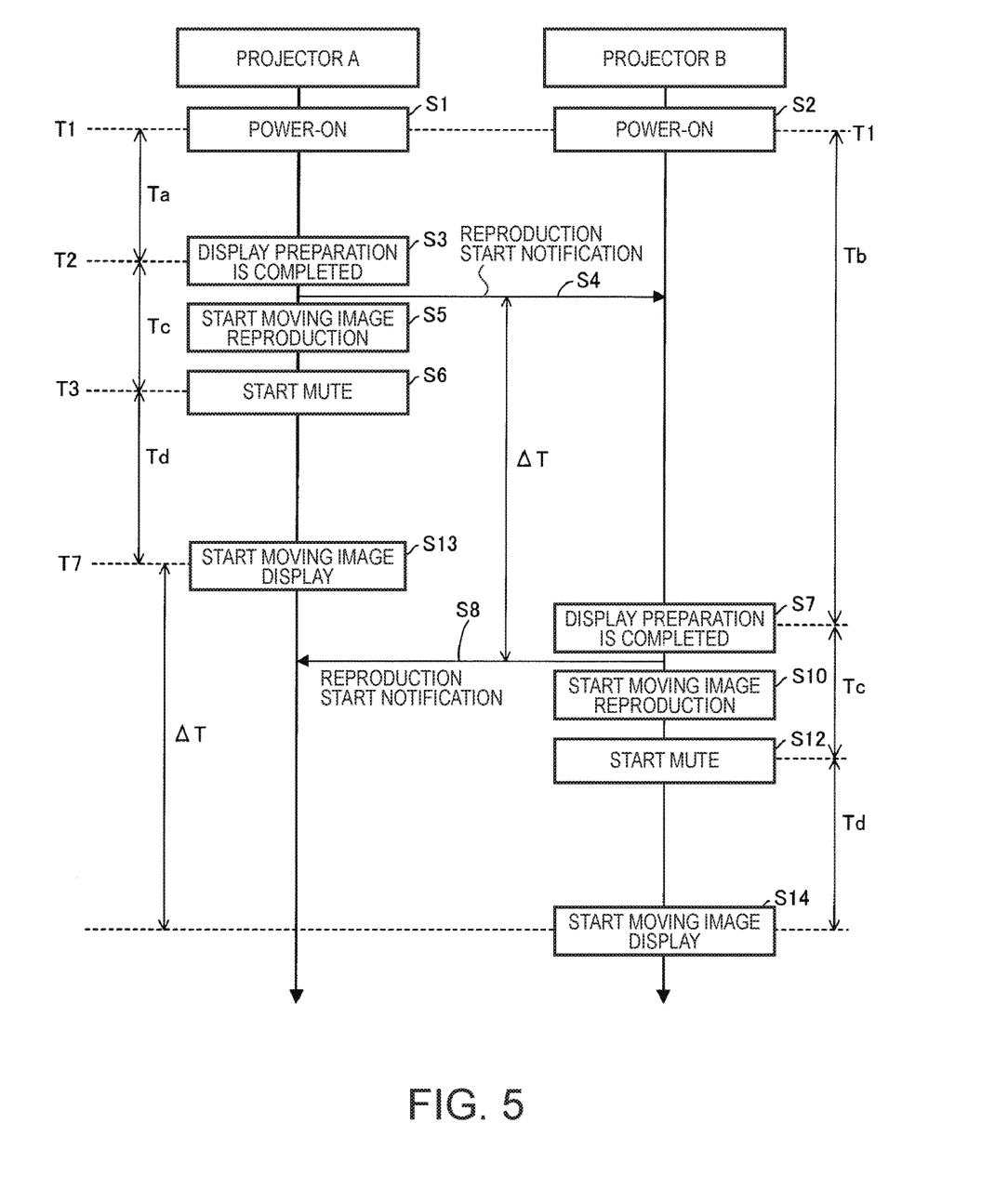
FIG. 5 is a sequence chart for explaining the operation in the first embodiment.

FIG. 5 is a sequence chart for explaining an example of operation performed when the reproduction start notification is transmitted from the projector B after the mute period Td in the projector A elapses (time T7). In FIG. 5, the same kinds of processing as the kinds of processing shown in FIG. 4 are denoted by the same signs. In the following explanation, among the kinds of processing shown in FIG. 5, kinds of processing different from the kinds of processing shown in FIG. 4 are mainly explained.

In the projector A, after causing the projecting section 5 to start mute, when the communication section 2 does not receive the reproduction start notification and the mute period Td elapses, the control section 4 causes the projecting section 5 to start moving image display (step S13).

In the projector A, thereafter, when the reproduction start notification reaches the communication section 2, the control section 4 causes the projecting section 5 to maintain the display of the moving image. In this case, a temporal shift ΔT occurs between a moving image projected by the projector A and a moving image projected by the projector B. When the control section 4 of the projector A executes steps S9 and S11 shown in FIG. 4 according to the reception of the reproduction start notification in order to eliminate the temporal shift, a phenomenon occurs in which the moving image display is once switched to black-out display. This phenomenon is likely to cause the user to misunderstand that a failure occurs in the projector A. Therefore, when the reproduction start notification reaches the communication section 2, the control section 4 causes the projecting section 5 to maintain the projection of the moving image.

At this time, the control section 4 stores, in the storing section 3, a time shift amount ΔT between timing when the reproduction start notification is transmitted in step S4 and timing when the reproduction notification is received from the projector B. The time shift amount ΔT coincides with a time shift amount between timing when the projector A starts the moving image display in step S13 and timing when the projector B starts the moving image display in step S14.

Figure 6:
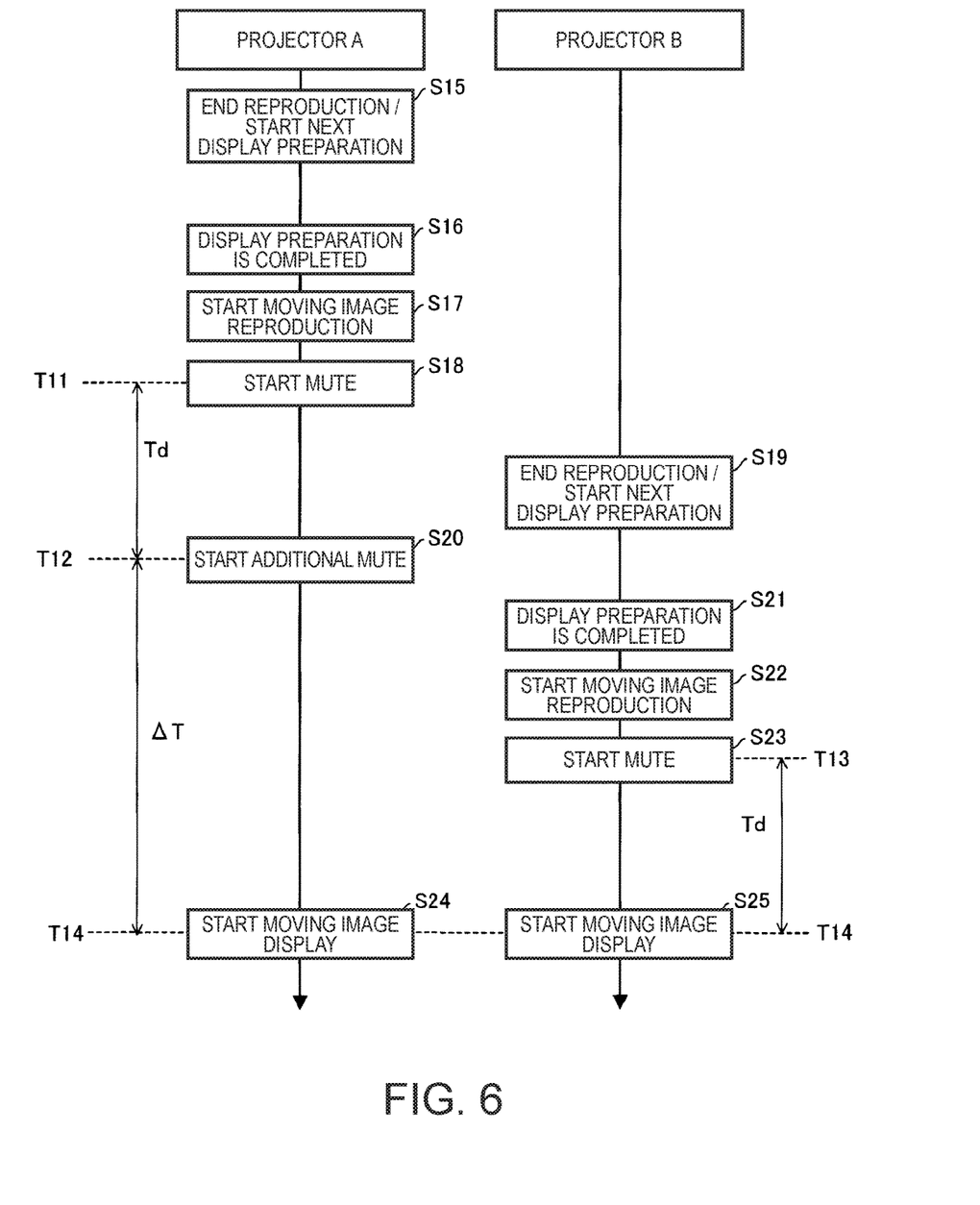
FIG. 6 is a sequence chart for explaining the operation in the first embodiment.

FIG. 6 is a sequence chart for explaining an example of operation for displaying the next image (moving image) after the operation shown in FIG. 5.

In the projector A, when the moving image reproduction started in step S5 of FIG. 5 ends, the control section 4 starts display preparation for the next moving image (e.g., switching of a readout position of moving image information from the storing section 3) (step S15).

When the display preparation is completed in the projector A (step S16), in the projector A, the control section 4 starts reproduction of the next moving image (step S17). Thereafter, the control section 4 prohibits the projecting section 5 from displaying the moving image and causes the projecting section 5 to start the mute in the period Td from time T11 (step S18).

In the projector A, when the mute in the period Td ends at time T12, the control section 4 reads out the time shift amount ΔT from the storing section 3, prohibits the projecting section 5 from displaying the moving image, and causes the projecting section 5 to execute mute (additional mute) in a period ΔT (step S20). When the additional mute ends at time T14, the control section 4 causes the projecting section 5 to start moving image display (step S24).

On the other hand, in the projector B, when the moving image reproduction ends, the control section 4 starts display preparation for the next moving image (step S19). When the display preparation is completed (step S21), the control section 4 starts moving image reproduction (step S22) and prohibits the projecting section 5 from displaying the moving image and causes the projecting section 5 to start the mute in the period Td from time T13 (step S23). When the mute in the period Td ends at time T14, the control section 4 causes the projecting section 5 to start moving image display (step S25).

In the example shown in FIG. 6, in the projector A in which the moving image display is started earlier than the projector B by the period ΔT, the control section 4 sets a mute period during a display start of the next moving image longer than the mute period of the projector B by the period ΔT. Consequently, in the projector A, the control section 4 causes the projecting section 5 to delay the next display timing of an image by the period Δt. Therefore, it is possible to synchronize the display timing of the next image between the projector A and the projector B. The period ΔT is an example of the third period.

Second Embodiment

In a second embodiment, each of a plurality of projectors included in the display system 100 belongs to any one of groups. Display is synchronized among the projectors belonging to the same group.

For example, it is assumed that, in a state in which three projectors A, B, and F are connected to the communication line C, the projectors A and B belong to a "group M" and the projector F belongs to a "group N". In this case, display is synchronized between the projector A and the projector B. However, display is not synchronized between the projector A and the projector F and between the projector B and the projector F.

In this embodiment, in the projectors A and B, the storing sections 3 store identification information of the group M. In the projector F, the storing section 3 stores identification information of the group N.

In the projectors A and B, the control sections 4 transmit a reproduction start notification added with the identification information of the group M. The control section 4 of the projector F transmits a reproduction start notification added with the identification information of the group N.

In each of the projectors A, B, and F, when the storing section 3 stores the same identification information as the identification information added to the reproduction start notification received by the communication section 2, the control section 4 prohibits the projecting section 5 from displaying an image for the period Td and thereafter causes the projecting section 5 to display a moving image.

Figure 7:
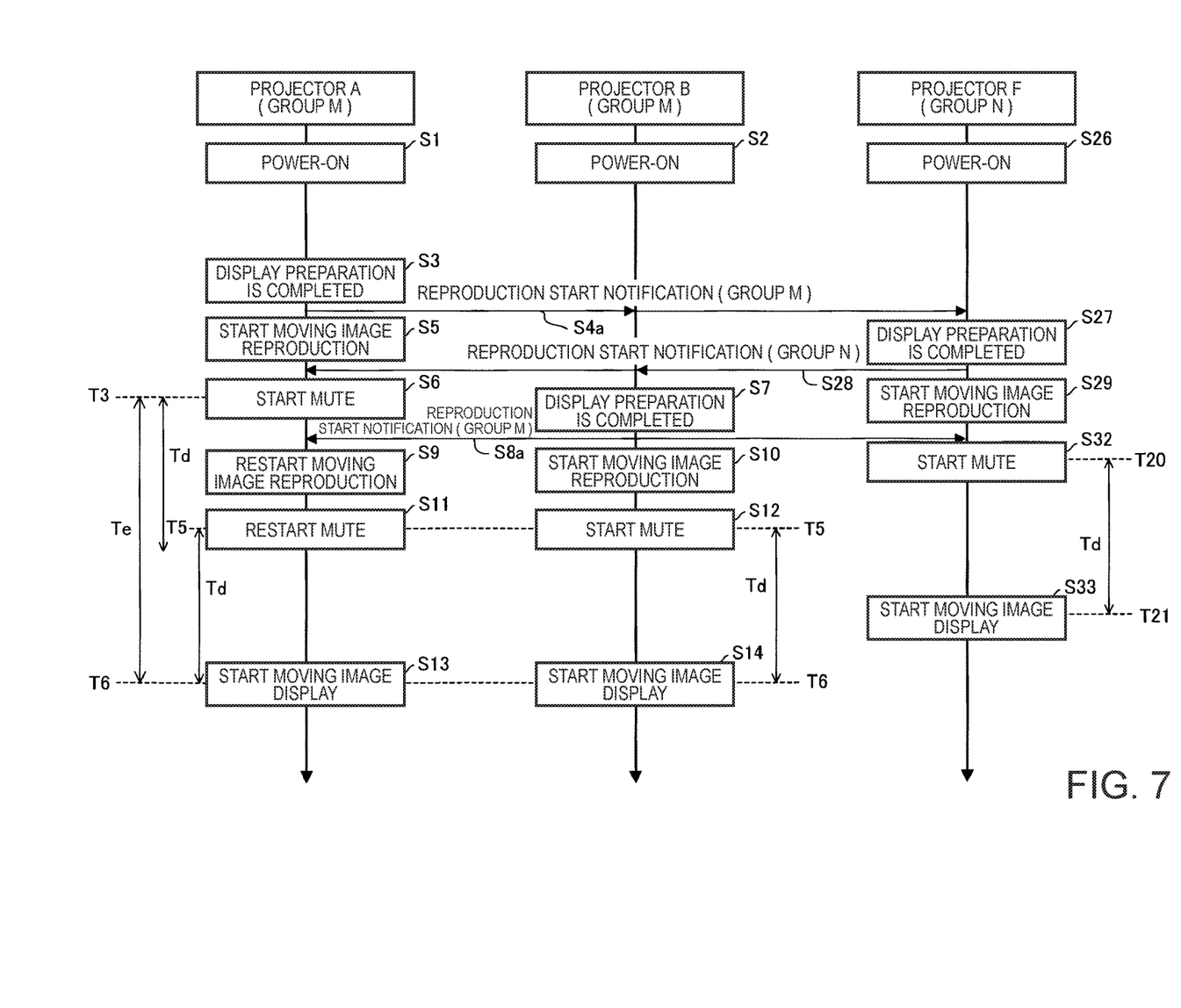
FIG. 7 is a sequence chart for explaining operation in a second embodiment.

FIG. 7 is a sequence chart for explaining operation in the second embodiment. In FIG. 7, step S4a is executed instead of step S4. Step S8a is executed instead of step S8. In FIG. 7, operation concerning the projector F is the same, specifically, steps S26, S27, S28, S29, S32, and S33 are respectively the same as steps S2, S7, S8a, S10, S12, and S14. Therefore, detailed explanation of the operation is omitted. In the following explanation, differences from the processing shown in FIG. 4 are mainly explained.

In step S4a, the control section 4 of the projector A transmits the reproduction start notification added with the identification information of the group M to the projectors B and F. The reproduction start notification transmitted in step S4a reaches the projectors B and F. However, since the projectors B and F are starting up, the projectors B and F cannot receive the reproduction start notification. Accordingly, the projectors B and F do not execute operation according to the reproduction start notification.

In step S28, the control section 4 of the projector F transmits the reproduction start notification added with the identification information of the group N to the projectors A and B. The reproduction start notification transmitted in step S28 reaches the projectors A and B.

Since the storing section 3 does not store the same identification information as the identification information of the group N added to the reached reproduction start notification, the control section 4 of the projector A discards the reached reproduction start notification. Since the projector B is starting up, the projector B cannot receive the reproduction start notification transmitted in step S28.

In step S8a, the control section 4 of the projector B transmits the reproduction start notification added with the identification information of the group M to the projectors A and F. The reproduction start notification transmitted in step S8a reaches the projectors A and F.

Since the storing section 3 stores the same identification information as the identification information of the group M added to the reached reproduction start notification, the control section 4 of the projector A sequentially executes steps S9, S11, and S13. Since the storing section 3 does not store the same identification information as the identification information of the group M added to the reached reproduction start notification, the control section 4 of the projector F discards the reached reproduction start notification.

Therefore, display is synchronized between the projector A and the projector B. However, display is not synchronized between the projector A and the projector F and between the projector B and the projector F.

As explained above, with the projector A and the control method for the projector A in the embodiments, it is possible to synchronize image display among a plurality of projectors without using devices for synchronization (e.g., a server and a host PC) other than the projectors. Therefore, it is possible to reduce components compared with when image display is synchronized among a plurality of projectors using a server and a host PC other than the projectors.

Modifications

The invention is not limited to the embodiments explained above. For example, various modifications explained below are possible. One or a plurality of modifications optionally selected out of forms of the modifications explained below can be combined as appropriate.

Modification 1

At least one of the order of step S5 and step S6, the order of step S10 and S12, the order of step S9 and step S11, the order of step S17 and step S18, the order of step S22 and step S23, and the order of step S29 and step S33 may be opposite.

Modification 2

When the reproduction start notification reaches the communication section 2 after the mute period Td ends (see step S8 in FIG. 5), the control section 4 may cause the projecting section 5 to restart the moving image reproduction and restart the mute without causing the projecting section 5 to maintain the projection of the moving image. In this case, it is possible to synchronize a moving image projected by the projector A and a moving image projected by the projector B.

Modification 3

Following step S16 shown in FIG. 6, the control section 4 may cause the communication section 2 to transmit the reproduction start notification. When the communication section 2 receives the reproduction start notification in an additional mute period, the control section 4 may cause the projecting section 5 to restart the moving image reproduction and restart the mute in the period Td.

Modification 4

In the embodiments, both of the mute period (the second period) corresponding to the transmission of the reproduction start notification and the mute period (the first period) corresponding to the reception of the reproduction start notification are set as the period Td. However, the mute periods may be set as different periods.

For example, timing when the projector A receives the reproduction start notification is later than timing when the projector B transmits the reproduction start notification by a time period required for the communication of the reproduction start notification. Therefore, the mute period (the second period) corresponding to the transmission of the reproduction start notification may be set longer than the mute period (the first period) corresponding to the reception of the reproduction start notification.

Modification 5

In the first embodiment, the number of projectors included in the display system 100 is not limited to two and may be three or more. In the second embodiment, the number of projectors included in the display system 100 only has to be two or more.

Modification 6

In the projecting section 5, the liquid crystal light valve is used as the light modulating device. However, the light modulating device is not limited to the liquid crystal light valve and can be changed as appropriate. For example, as the light modulating device, three reflection-type liquid crystal panels may be used. The light modulating device may be a configuration such as a system in which one liquid crystal panel and a color wheel are combined, a system in which three digital mirror devices (DMDs) are used, or a system in which one digital mirror device and a color wheel are combined. When only one liquid crystal panel or DMD is used as the light modulating device, a member equivalent to the color separation optical system or the color combination optical system is unnecessary. Besides the liquid crystal panel and the DMD, a configuration capable of modulating the light emitted by the light source can be adopted as the light modulating device.

Modification 7

The projector is used as the display device in the embodiments. However, the display device is not limited to the projector and can be changed as appropriate. For example, the display device may be a direct-viewing type display (a liquid crystal display, an organic EL (Electro Luminescence) display, a plasma display, a CRT (cathode ray tube) display, etc.).

What is claimed is:

1. A display device comprising:
   a communication line configured to perform communication with an external display device;
   a display configured to display an image corresponding to image information; and
   a processor configured to cause the communication line to transmit first information to the external display device and, when waiting to receive second information from the external display device via the communication line after causing the communication line to transmit the first information to the external display device, prohibit the display from displaying the image for a first period and thereafter cause the display to display the image,
   wherein the processor starts preparation for displaying the image according to power-on of the display device and, after the preparation is completed, causes the communication line to transmit the first information to the external display device, and
   wherein, when the communication line has not received the second information for a second period after the processor prohibits the display section from displaying the image according to the transmission of the first information, the processor causes the display to display the image; when the communication line receives the second information before the second period elapses, the processor prohibits the display from displaying the image for the first period and thereafter causes the display to display the image; and, when the second information reaches the communication line after the second period elapses, the processor causes the display to maintain the display of the image.

2. A display device comprising:
   a communication line configured to perform communication with an external display device;
   a display configured to display an image corresponding to image information; and
   a processor configured to cause the communication line to transmit first information to the external display device and, when waiting to receive second information from the external display device via the communication line after causing the communication line to transmit the first information to the external display device, prohibit the display from displaying the image for a first period and thereafter cause the display to display the image,
   wherein the processor starts preparation for displaying the image according to power-on of the display device and, after the preparation is completed, causes the communication line to transmit the first information to the external display device, and
   wherein, when the communication line has not received the second information for a second period after the processor prohibits the display section from displaying the image according to the transmission of the first information, the processor causes the display to display the image; when the communication line receives the second information before the second period elapses, the processor prohibits the display from displaying the image for the first period and thereafter causes the display to display the image; and, when the communication line receives the second information after the second period elapses, the processor causes the display to delay next display timing of the image by a third period corresponding to a time shift amount between transmission timing of the first information and reception timing of the second information.

3. The display device according to claim 1, wherein the second information includes identification information, and
   when the display device includes same identification information as the identification information added to the second information received by the communication line, the processor prohibits the display from displaying the image for the first period and thereafter causes the display to display the image.

4. A display system comprising a first display device and a second display device, wherein the first display device and the second display device are the display device according to claim 1.

5. A control method for a display device including a processor, a communication line configured to perform communication with an external display device and a display configured to display an image corresponding to image information, the control method comprising causing, by the processor, the communication line to transmit first information to the external display device and, when waiting to receive second information from the external display device via the communication line after causing the communication line to transmit the first information to the external display device, prohibiting by the processor, the display from displaying the image for a first period and thereafter causing the display to display the image,     wherein the processor starts preparation for displaying the image according to power-on of the display device and, after the preparation is completed, causes the communication line to transmit the first information to the external display device, and     wherein, when the communication line has not received the second information for a second period after the processor prohibits the display section from displaying the image according to the transmission of the first information, the processor causes the display to display the image; when the communication line receives the second information before the second period elapses, the processor prohibits the display from displaying the image for the first period and thereafter causes the display to display the image; and, when the second information reaches the communication line after the second period elapses, the processor causes the display to maintain the display of the image.

6. A control method for a display device including a processor, a communication line configured to perform communication with an external display device and a display configured to display an image corresponding to image information, the control method comprising causing, by the processor, the communication line to transmit first information to the external display device and, when waiting to receive second information from the external display device via the communication line after causing the communication line to transmit the first information to the external display device, prohibiting, by the processor, the display from displaying the image for a first period and thereafter causing the display to display the image,     wherein the processor starts preparation for displaying the image according to power-on of the display device and, after the preparation is completed, causes the communication line to transmit the first information to the external display device, and     wherein, when the communication line has not received the second information for a second period after the processor prohibits the display section from displaying the image according to the transmission of the first information, the processor causes the display to display the image; when the communication line receives the second information before the second period elapses, the processor prohibits the display from displaying the image for the first period and thereafter causes the display to display the image; and, when the communication line receives the second information after the second period elapses, the processor causes the display to delay next display timing of the image by a third period corresponding to a time shift amount between transmission timing of the first information and reception timing of the second information.

\* \* \* \* \*